United States Patent [19]

Bonnebat et al.

[11] 4,421,711

[45] Dec. 20, 1983

[54] MOLDING OF ELONGATE, HOLLOW, BIAXIALLY ORIENTED THERMOPLASTIC SHAPED ARTICLES

[75] Inventors: Claude Bonnebat, Pontault Combault; Louis Macabrey, Mitry-le-Neuf, both of France

[73] Assignee: Rhone-Poulenc Industries, Paris, France

[21] Appl. No.: 271,380

[22] Filed: Jun. 8, 1981

[30] Foreign Application Priority Data

Jun. 13, 1980 [FR] France .................. 80 13158

[51] Int. Cl.³ .............................................. B29C 17/07
[52] U.S. Cl. ........................................ 264/529; 264/573
[58] Field of Search ............ 264/529, 530, 573; 428/35, 36

[56] References Cited

U.S. PATENT DOCUMENTS

| | | | |
|---|---|---|---|
| 4,034,036 | 7/1977 | Farrell | 264/530 X |
| 4,151,250 | 4/1979 | Barry et al. | 264/529 X |
| 4,177,239 | 12/1979 | Gittner et al. | 264/529 X |

FOREIGN PATENT DOCUMENTS 53-54270  5/1978  Japan ......................... 264/573

*Primary Examiner*—Jan H. Silbaugh
*Attorney, Agent, or Firm*—Burns, Doane, Swecker & Mathis

[57] ABSTRACT

An elongate, rigid, tubular, biaxially oriented thermoplastic, hollow thin-walled shaped article is molded by (i) introducing into an elongate mold cavity, the internal configuration and dimensions thereof corresponding to the exterior surface area of the desired shaped article, and aligning along the longitudinal axis thereof, a hollow tubular thermoplastic preform heated to the biaxial orientation temperature of said thermoplastic; (ii) expanding under internal pressure said heated preform to simultaneously, both longitudinally and transversely, uniformly stretch same, at least to the natural biaxial drawing ratio thereof, but to a value in the transverse direction of less than 100% of that ultimately desired; (iii) next further expanding said heated preform, under increased internal pressure, completely against the internal walls of the mold cavity to thus completely shape said ultimately desired shaped article; and (iv) then cooling said desired shaped article and releasing all pressure therefrom.

8 Claims, No Drawings

MOLDING OF ELONGATE, HOLLOW, BIAXIALLY ORIENTED THERMOPLASTIC SHAPED ARTICLES

BACKGROUND OF THE INVENTION

1. Field of the Invention:

The present invention relates to a process for the manufacture, at a very rapid rate, of long, rigid, biaxially oriented, thermoplastic tubular-shaped articles, or "profiles", having thin walls.

By the expressions "long tubular profiles" or "shaped articles", there are intended, consistent with this invention, hollow tubes having a cylindrical, rectangular or other cross section, a longitudinal section which is linear or which can vary along the longitudinal axis, an internal diameter or inscribed diameter equal to at least 2 cm and a length/diameter ratio ranging from about 10/1 to 300/1. By the expression "thin walls", there is intended a thickness ranging from about 0.15 mm to about 2 mm. The subject profiles or shaped articles are open at both ends.

2. Description of the Prior Art:

It is known to this art, in the manufacture of biaxially drawn or oriented hollow tubes, that the tube continuously emerging from an extruder, in the thermoplastic state, is biaxially drawn or stretched by a simultaneous operation during which the longitudinal drawing is effected by simple traction, while the cross section is simultaneously enlarged by means of excess internal pressure in a calibration sleeve or on an internal mandrel, said cross section increasing as a function of the desired diameter and the desired thickness. These processes are conducted continuously, in line with the extruder. The application of such process to thermoplastics which can be oriented from the amorphous state makes it necessary for the preformed tube continuously emerging from the extruder to be rapidly cooled in the amorphous state and then reheated to the biaxial drawing temperature. Processes of this type present problems with respect to rate of production and of temperature control, and mandate the use of a lubricant to permit a uniform flow of the tube in the calibration device. This type of technique is poorly suited to the production of rigid tubes having thin walls, because it exhibits the disadvantage of giving rise to the formation of a tube, the thickness of which is not constant because of the friction between the walls of the tube and the calibration device, which friction causes non-uniformities or irregularities in the drawing. Moreover, it is very difficult to regulate the extent of drawing, or stretching, in the longitudinal and transverse directions to those ratios which make it possible to obtain the optimum mechanical properties.

The difficulties inherent in continuous processes increase considerably, if it be desired to shape profiles, the walls of which not being smooth or the cross section of which can vary, for example, profiles or shaped articles possessing grooves or projections, channels, angled sides, or projecting or receding parts for reinforcement or decoration, and which must be shaped, by internal blowing or pressure reduction, in half-molds which are arranged in series and move with the parison.

Also compare, generally, U.S. Pat. Nos. 3,936,260, 4,098,857, 4,108,937 and 4,130,617; French Pat. Nos. 2,184,857, 2,365,423 and 2,389,478; British Patent Specification Nos. 1,432,539, 1,514,277 and 1,523,309; German Auslegeschrift No. 2,705,775; Research Disclosure, 12906, January 1975.

SUMMARY OF THE INVENTION

Accordingly, a major object of the present invention is the provision of an improved process for the manufacture, at a high rate of production, of rigid tubular shaped articles having thin walls, which shaped articles are both thermoplastic and biaxially oriented.

Briefly, the subject process features:

(i) preheating a tubular blank, or preform, to the biaxial orientation temperature of the thermoplastic material, and (ii) then placing same in a mold cavity, along that axis thereof having the configuration and the dimensions of the profile or shaped article desired to be produced;

(iii) next exerting an internal pressure on the preform in order to simultaneously effect uniform longitudinal drawing or stretching, and a uniform radial pre-swelling, at least to such extent as the natural biaxial drawing ratio of the material;

(iv) then increasing the internal pressure in order to dilate or expand the blank to the maximum extent against the walls of the mold; and (v) cooling the resultant tubular-shaped article and releasing the pressure.

DETAILED DESCRIPTION OF THE INVENTION

More particularly according to this invention, exemplary thermoplastics well adapted herefor are preferably crystalline polymers characterized by a well-defined natural drawing ratio, such as saturated polyesters, and polyamides. The thermoplastic which is especially preferred consists of ethylene terephthalate homopolymers and copolymers which contain at least 90 mol % of terephthalic acid recurring units and at least 90 mol % of ethylene glycol recurring units, and the intrinsic viscosity of which ranges from 0.50 dl/g to 1.10 dl/g, measured in o-chlorophenol at 25° C.

By "natural biaxial drawing ratio" as utilized herein, there is intended that critical threshold characteristic of the particular thermoplastic, beyond which, because of the inherent rheology thereof, spontaneous regularity of its deformation naturally occurs. The longitudinal and transverse natural drawing ratios vary in accordance with the nature of the polymer, its viscosity and the temperature at which the drawing is carried out. The existence of the said ratios can be demonstrated, and their values can be determined, by studying the blowing of a closed length of tube subjected to preliminary uniform thermal conditioning, when, under the influence of progressively increasing internal pressure, the intermediate formation of a deformed cylinder is perfectly uniform in longitudinal section, after which the deformation continues simultaneously and uniformly in all zones/directions. The values $\lambda_{Tn}$=observed diameter/average initial diameter and $\lambda_{Ln}$=observed length/average initial length correspond to the transverse and longitudinal natural drawing ratios. The biaxial natural drawing ratio is the product $\lambda_{Tn} \cdot \lambda_{Ln}$. In the case where the profile or shaped article is not cylindrical, reference is made to the inscribed diameter (the smallest circle which can be inscribed along the longitudinal axis) in order to define the diameter of the expanded blank at its said natural drawing ratio.

In the biaxial drawing or orientation process according to the invention, the tubular blank or preform is elongated axially to the value $\lambda_{Ln}$, not by mechanical means, but by means of a pressurized fluid, while it is simultaneously pre-expanded to a value which is less than the final diameter and at least equal to the transverse natural drawing ratio $\lambda_{Tn}$. In a second stage, the pressure inside the stretched tube is increased such as to effect additional expansion in the transverse direction, until the material has been flattened against the walls of the mold. It is particularly advantageous for the blank to be pre-expanded to the value $\lambda_{Tn}$ or, at most, to 5% above such value.

The tubular blank is obtained by cutting a tube which has been preliminarily extruded, calibrated and cooled.

To obtain a finished shaped article of defined length and diameter, it is necessary to select the initial geometry of the tubular blank vis-a-vis the drawing conditions and the inherent characteristics of the material, such that, at an intermediate stage in the biaxial natural drawing ratio, the blank reaches 100% of the length of the ultimately desired drawn tube and about 70 to 90% of its diameter. In the case of polyethylene terephthalate, the longitudinal natural drawing ratio $\lambda_{Ln}$ is between 1.2 and 3.5 and the transverse natural drawing ratio $\lambda_{Tn}$ is between 3.2 and 5, depending on the intrinsic viscosity of the material and the drawing temperature.

The blow mold typically comprises two shells or mold halves, the shape and geometry of which corresponds to that of the ultimately desired shaped article, and which can possess smooth walls or relief portions.

The precise temperature to which the blank is heated depends on the material from which it is shaped. If the tube is made of polyethylene terephthalate, a temperature on the order of 90°–120° C. can be used. The mold either may or may not be heated. Preferably, in order to improve the transfer of any mold relief or impression, a mold with heated walls is used, it being possible for the heating to be ensured in a homogeneous manner by circulating oil in suitable jacket. The temperature of the mold is selected in accordance with the nature of the polymer and the desired properties of the finished shaped article, bearing in mind the intended use thereof. It is possible to select a temperature range which allows relaxation of the internal stresses, or alternatively higher temperatures for the thermofixing of the material, which may cause an increase in the crystallinity.

The pressurized fluid used for the expansion and drawing of the preform is injected through an inlet pipe fitted to at least one of the ends of the said preform, the other end being sealed in any suitable manner, if appropriate. A plug of insulating material can be used for this purpose. In order to avoid contact of the blank or preform with the walls of the mold in the pre-blowing stage, it is useful to provide guiding means which makes it possible to control the alignment of the tube along the major axis of the mold. The pressure required depends on the initial geometry of the blank and also on the material used and the processing temperature therefor. For example, for a cylindrical blank which is made of polyethylene terephthalate having an intrinsic viscosity on the order of 0.70 to 0.80 dl/g, and which has a diameter of 20 to 25 mm and is blown at 95°–120° C., an initial pressure of 3 to 8 bars is used; in order to effect a transverse overdrawing of 10 to 30% above the natural drawing ratio, a pressure of between 10 and 25 bars is required. To prevent the material from cooling, the blowing fluid can be preheated to a temperature in the vicinity of the biorientation temperature.

When the blank has been expanded to the maximum extent in the mold, the tubular profile is cooled in any suitable manner, for example, by cooling the halves of the mold or by flushing the interior of the shaped article with a cooling fluid. It is preferred to maintain the internal pressure at least partially, until the temperature of the material has decreased below that point at which shrinkage could take place.

In another embodiment of the subject process, the internal pressure is partially released such as to permit the material to retract freely, and then the pressure is again exerted, the material is cooled to a rigid state and the pressure is finally released.

The process according to the invention makes it possible to obtain transparent, biaxially oriented, rigid, hollow profiles or shaped articles, having thin walls, of any shape whatsoever, with faithful reproduction of the impression of the surface of the mold cavity, a high uniformity in the thickness of the walls and an excellent surface appearance. Moreover, the profiles/articles obtained possess mechanical properties and a dimensional heat stability which are markedly superior to those which would be obtained in accordance with the conventional processes of continuous extrusion. Their properties enable them to be used, for example, for conveying pressurized fluids, as protective tubes for lighting, or, after sectioning, as container bodies in the packaging industry. For the production of container bodies, the shape of the profile is selected such as to correspond to the reproduction of the shape of the elements which it is desired to obtain. It too can prove advantageous to provide a projecting groove or a channel at the level of each element, the sectioning taking place in the channel, which facilitates the subsequent fixing of the metal or plastic ends, produced separately, to the container bodies by crimping or welding. The containers obtained can be used for the storage of still or pressurized liquids and of food products.

In order to further illustrate the present invention and the advantages thereof, the following specific examples are given, it being understood that same are intended only as illustrative and in nowise limitative.

EXAMPLE 1

A length of tube (tubular blank or preform) having a drawable length of 55 cm, an external diameter of 24.5 mm and a wall thickness of 2.75 mm was used as starting material. The blank was obtained simply by cutting to length a cylindrical tube, extruded, calibrated and cooled while in amorphous state, fabricated from polyethylene terephthalate having a viscosity of 0.78 dl/g (measured at 25° C. in ortho-chlorophenol).

The blank was preheated to about 110° C. by means of infra-red heating elements and was transferred inside a vertical mold having cold walls, which consisted of two cylindrical half-shells having an internal diameter of 99 mm and a length of 140 cm. The blank was hermetically sealed at one end by a plug of insulating material, joined to a guide rod, and the other end was connected to a compressed air supply via an inlet tube. The compressed air was blown into the blank under a pressure of 6 bars, which effected, simultaneously, the total (100%) desired longitudinal drawing or stretching and a pre-swelling or expansion correspondence to an average transverse drawing ratio of 3.88. As soon as the desired longitudinal drawing was obtained, the pressure was increased to 20 bars such as to dilate or further expand the blank radially until it closely fitted the shape of the internal surface of the mold. After a contact time of 5 seconds, the internal pressure was released and the resultant profile, which had a length of 140 cm, an internal diameter of 99 mm and a thickness of 0.24 mm, was then released from the mold.

The profile or shaped article had a modulus of elasticity under tension of 3,050 MPa in the longitudinal direction and 6,885 MPa in the transverse direction, according to French Standard Specification 51,034. It had a uniformity of thickness of ±5% in the longitudinal direction, over 95% of the linear extent thereof.

EXAMPLE 2

A cylindrical tubular blank (preform) having a length of 2 meters, an external diameter of 27.2 mm and a wall thickness of 3.5 mm and made of polyethylene terephthalate having an intrinsic viscosity 0.70 dl/g was utilized.

The blank was preheated to 100° C. and transferred into a mold, the walls of which were heated to 120° C. The mold had a length of 5 meters and an internal diameter of 115 mm.

The blank was blown in a first stage with the aid of air preheated to about 100° C., under a pressure of 5 bars, in order to simultaneously effect the total extent (100%) of longitudinal drawing and a radial pre-expansion corresponding to a transverse drawing ratio of 4. As soon as the total desired longitudinal drawing or stretching was obtained, the pressure inside the intermediate blank was increased to 20 bars. The walls of the profile were maintained in contact with the walls of the hot mold for 10 seconds. The pressure was partially released in order to allow the material to retract freely, and the pressure was again applied. Finally, the resultant profile was cooled internally by flushing with expanded $CO_2$ and the pressure was finally released.

The profile had a modulus of elasticity of 8,125 MPa in the transverse direction and 3,450 MPa in the longitudinal direction. It had a uniformity of thickness of ±2.5% in the transverse direction and ±3% in the longitudinal direction, over 95% of the linear extent thereof. It also had an excellent dimensional stability, up to 95° C.

Of course, the invention is not to be construed as being limited to the specific embodiments described and can vary as would be apparent to those skilled in the art, depending on the particular end use applications envisaged. Thus, the details concerning shape and structure can be widely modified without thereby departing from the spirit of the invention. The tubular blank can consist of a composite material possessing a covering on the inner and/or outer wall, which covering is intended to improve certain properties and can be obtained either by co-extrusion or by coating in accordance with known methods. For example, the covering or coating (or laminate) can be a covering impermeable to gases and vapors, and based, for example, on polymers or copolymers of acrylonitrile, vinylidene chloride and/or vinyl alcohol, or of any other material used for this purpose.

It is also possible, if desired, to incorporate additives, such as colorants, stabilizers and reinforcing fillers, into the constituent material of the blank. Preferred fillers are short fibers, such as ground glass fibers, and lamella fillers, such as micas, graphites and talcs, which have the property of orientating themselves locally in the plane of the wall of the biaxially oriented profile, thus imparting thereto a greater rigidity, a better resistance to flow under the effect of internal pressure, and an enhanced impermeability to gases and vapors.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the manufacture of an elongate, rigid, tubular, biaxially oriented thermoplastic, hollow thin-walled shaped article which is open at both ends, has an internal diameter or inscribed diameter equal to at least 2 cm, and a length to diameter ratio of at least about 10/1 comprising (i) introducing into an elongate mold cavity, the internal configuration and dimensions thereof corresponding to the exterior surface area of the desired shaped article, and aligning along the longitudinal axis thereof, a long tubular thermoplastic blank which is open at both ends and which is heated to the biaxial orientation temperature of said thermoplastic; (ii) expanding under internal fluid pressure in the absence of mechanical stretching means said heated tubular blank to simultaneously, both longitudinally and transversely, uniformly stretch same, at least to the natural biaxial drawing ratio thereof, but to a value in the transverse direction of less than 100% of that ultimately desired so as to avoid any contact between the tubular blank and the internal walls of the mold cavity prior to the completion of said longitudinal stretching; (iii) next further expanding said heated tubular blank, under increased internal pressure, completely against the internal walls of the mold cavity to thus completely shape said ultimately desired shaped article; and (iv) thence cooling said desired shaped article and releasing all pressure therefrom.

2. The process as defined by claim 1, the transverse pre-stretch (ii) being to a value ranging from the natural transverse draw ratio of the thermoplastic to a value 5% in excess thereof.

3. The process as defined by claim 1, the expansion (ii) being to 100% of the desired uniform stretch in the longitudinal direction and to 70 to 90% of the desired uniform stretch in the transverse direction.

4. The process as defined by claim 3, the expansion (ii) being under internal fluid pressure, with said fluid being heated to the biaxial orientation temperature of the thermoplastic.

5. The process as defined by claims 3 or 4, said mold cavity being heated.

6. The process as defined by claims 3 or 4, said internal pressure being partially released and then again exerted, prior to the cooling/releasing step (iv).

7. The process as defined by claims 3 or 4, said thermoplastic preform comprising a homopolymer or copolymer of ethylene terephthalate and being heated to a temperature ranging from 90° to 120° C., and the expansion (ii) being to a longitudinal natural draw ratio ranging from 1.2 to 3.5 and to a transverse natural draw ratio ranging from 3.2 to 5.

8. The process as defined by claim 7, said initial internal pressure ranging from 3 to 8 bars and said increased pressure ranging from 10 to 25 bars.

* * * * *